(12) United States Patent
Russell et al.

(10) Patent No.: US 11,447,390 B2
(45) Date of Patent: *Sep. 20, 2022

(54) PROCESS FOR REMOVING OXYGEN FROM A HYDROGEN STREAM

(71) Applicant: UOP LLC, Des Plaines, IL (US)

(72) Inventors: Bradley P. Russell, Carol Stream, IL (US); William Macallan Cady, Chicago, IL (US); Stephen Caskey, Villa Park, IL (US); Nasser Khazeni, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,791

(22) Filed: Jun. 18, 2021

(65) Prior Publication Data

US 2021/0309517 A1 Oct. 7, 2021

Related U.S. Application Data

(63) Continuation-in-part of application No. 16/751,459, filed on Jan. 24, 2020.

(60) Provisional application No. 62/809,033, filed on Feb. 22, 2019.

(51) Int. Cl.

| | | |
|---|---|---|
| *B01D 53/00* | (2006.01) | |
| *C01B 3/58* | (2006.01) | |
| *B01D 53/047* | (2006.01) | |
| *B01D 53/04* | (2006.01) | |
| *B01D 53/26* | (2006.01) | |

(52) U.S. Cl.
CPC .............. *C01B 3/58* (2013.01); *B01D 53/047* (2013.01); *B01D 53/0423* (2013.01); *B01D 53/0462* (2013.01); *B01D 53/261* (2013.01); *B01D 2253/104* (2013.01); *B01D 2253/108* (2013.01); *B01D 2255/20761* (2013.01); *B01D 2256/16* (2013.01); *B01D 2257/102* (2013.01); *B01D 2257/104* (2013.01); *B01D 2257/80* (2013.01); *B01D 2259/4002* (2013.01); *B01D 2259/402* (2013.01); *B01D 2259/403* (2013.01); *B01D 2259/404* (2013.01); *B01D 2259/40007* (2013.01); *B01D 2259/40013* (2013.01); *B01D 2259/40039* (2013.01); *B01D 2259/40045* (2013.01); *B01D 2259/4062* (2013.01); *B01D 2259/40075* (2013.01); *C01B 2203/043* (2013.01); *C01B 2203/0435* (2013.01); *C01B 2203/0495* (2013.01)

(58) Field of Classification Search
CPC .......... B01D 2257/504; B01D 2257/80; B01D 53/047; B01D 53/0462; B01D 53/8671; B01D 53/0423; B01D 53/0438; B01D 53/0446; B01D 53/261; B01D 53/864; Y02C 20/40; Y02C 20/20

See application file for complete search history.

(56) References Cited

U.S. PATENT DOCUMENTS

2014/0308176 A1* 10/2014 Golden ............... C01B 21/0416
423/247

* cited by examiner

*Primary Examiner* — Sharon Pregler

(74) *Attorney, Agent, or Firm* — Paschall & Associates, LLC; Mark Goldberg

(57) ABSTRACT

An adsorption process is provided to remove oxygen from a hydrogen stream through the use of a copper material in combination with layers of adsorbent to remove water and nitrogen from a hydrogen stream. This process is particularly useful for purification of hydrogen product gas from water electrolyzers with the hydrogen product gas having greater than 99.9 mol % purity.

20 Claims, No Drawings

PROCESS FOR REMOVING OXYGEN FROM A HYDROGEN STREAM

This continuation-in-part application claims priority from U.S. patent application Ser. No. 16/751,459, filed on Jan. 24, 2020 which claims priority from provisional application 62/809,033 filed on Feb. 22, 2019.

BACKGROUND OF THE INVENTION

The invention relates to a process for removing oxygen from a hydrogen stream. More specifically, the invention relates to the use of a catalyst in a temperature swing or a pressure swing adsorption unit to remove oxygen from a gas stream such as from hydrogen product gas from a water electrolyzer.

Oxygen removal is difficult in pressure swing adsorption (PSA) hydrogen units due to the low oxygen capacity of conventional adsorbents (including activated carbon, molecular sieve zeolites, activated alumina, and silica gel). In situations where oxygen removal is required, PSA bed volume increases substantially and hydrogen recovery drops by several percentage points. For example, in propane dehydrogenation units (such as UOP's Oleflex™ process), a small amount of air ingress is possible due to low-pressure (vacuum) operation, leading to the presence of oxygen (50 to 100 ppmv) in net gas feed to PSA unit. In cases where the PSA hydrogen product is exported, a typical oxygen pipeline specification is <1 ppmv. However, in prior art processes oxygen removal causes a large drop in PSA hydrogen recovery. A similar issue is found in other situations that require similar oxygen removal requirements (e.g., refinery off-gas and coke oven gas) and these processes also suffer from low PSA hydrogen recovery and large PSA bed volume due to low oxygen capacity of conventional adsorbents.

In addition, it has been found that a significant source of hydrogen is from water electrolysis including the use of electricity produced by renewable fuels in which the gas stream is mostly hydrogen with relatively small amounts of oxygen, water and nitrogen that need to be removed before the hydrogen is used for other purposes.

Accordingly, an improved oxygen adsorbent or catalyst is needed for PSA applications that require oxygen removal. It has now been found that an activated alumina catalyst comprising copper is particularly effective in removing oxygen without impacting the recovery of hydrogen. Other catalysts such as palladium and platinum may be substituted if commercially viable.

SUMMARY OF THE INVENTION

A catalyst material such as a copper, palladium, or platinum material has been found to be effective to remove oxygen with a very high working capacity in a pressure swing adsorption cycle, resulting in much improved PSA performance and cost. The catalyst material results in the reaction of oxygen with hydrogen to produce water. Hydrogen product gas from a water electrolyzer is generally saturated with water. The presence of water can be problematic in the oxygen removal system due to inhibition of the oxidation reaction and due to very high water concentrations in the adsorption bed and possible condensation of liquid water. A method is needed to cost effectively remove the water in hydrogen gas upstream of the oxygen removal system. Accordingly, a layer of dehydration adsorbent such as silica gel, activated alumina, or 13X zeolite can be used in the PSA or temperature swing adsorption (TSA) unit for water removal at the feed end of the bed upstream of the oxidation catalyst. Additional water formed by the oxidation reaction can be removed in a downstream desiccant layer of silica gel, activated alumina, or 13X zeolite. A layer of CaX zeolite or 5A zeolite may be added at the product end of the bed when needed to remove nitrogen.

Based on experimental results to date, it is believed that the catalyst material functions by an oxidation/reduction mechanism: i.e., oxygen is chemisorbed during the high-pressure feed step in the PSA cycle, and then copper is reduced (thereby forming water) during the regeneration/counter-current purge step. Incorporating water removal, oxygen removal, and nitrogen removal in a single bed by suitable arrangement of functional adsorbent/catalyst layers allows one to maintain high hydrogen recovery, small PSA or TSA bed volume, and a single unit operation for complete purification of hydrogen gas from a water electrolyzer.

DETAILED DESCRIPTION OF THE INVENTION

It has been found that hydrogen product gas from a water electrolyzer is generally saturated with water and contains trace levels of oxygen and sometimes nitrogen. Oxygen and nitrogen impurities range from about 20 to about 2,000 ppmv each in the hydrogen gas stream. In order to meet fuel cell grade hydrogen purity specifications, these contaminants (water, oxygen, and nitrogen) must be removed.

These contaminants can be removed with conventional adsorbents in a PSA unit. However, standard adsorbents have a low capacity for removing oxygen in such processes. As a result, removing oxygen to a typical fuel cell grade hydrogen specification of less than 5 ppmv from the hydrogen feed gas using a pressure swing adsorption unit results in a significant hydrogen recovery drop of about 20 percentage points (e.g., hydrogen recovery decreases from 90% to about 70%) and a bed volume increase of three times. Oxygen can be removed upstream of the PSA unit in a separate reactor, but this added unit operation increases the capital cost and required equipment in the overall treatment system.

It has now been found that adding an additional layer of a catalyst within the PSA bed such as a copper, palladium or platinum material and preferably a copper material is successful in removing oxygen from a feed stream without a decrease in hydrogen recovery and without the need for a separate upstream reactor. For example, the feed gas in TABLE 3 can be purified in a PSA unit comprising a layer of copper material with a hydrogen product purity of 99.9 mol % and oxygen less than 1 ppmv with 90% hydrogen recovery. In one embodiment of the invention, the feed passes first through a dehydration layer of activated alumina, silica gel, or activated carbon to remove water. Then the feed passes through a layer of copper material to remove oxygen by the reaction of oxygen with hydrogen in the presence of the copper material which acts as a catalyst, followed by a second layer of a dehydration adsorbent such as activated alumina, silica gel or activated carbon to remove water generated by the copper material layer. In some cases where there is nitrogen in the feed gas, a final adsorbent layer such as a calcium X zeolite may be present to lower the nitrogen content to the desired level. The copper material, which may be more than 10% by weight of an adsorbent having an activated alumina support, has an apparent adsorption capacity for oxygen that is about 300 times higher than the activated carbon adsorbent used in the prior art. The copper material is typically loaded in oxidized form (e.g. CuO), and is subsequently reduced to copper metal during normal adsorbent bed operation in a reducing (hydrogen) environment. There is a high degree of macro-porosity in the activated alumina support for rapid adsorption and short mass transfer zone. Typically, the copper material has a bulk density of about 800 kg/m3.

It has been found that the catalyst material, such as the copper material, may be used in a post-treatment system for hydrogen product gas from water electrolyzer processes. In the electrolysis of water, oxygen and water are the main contaminants of the hydrogen stream with a low level of nitrogen present in some cases. A desiccant layer located before and after a layer of the catalyst material may be used to remove water. A layer of CaX or 5A zeolite or other appropriate adsorbent may be used to remove nitrogen. A copper containing catalyst is used in the PSA bed to convert trace oxygen to water. This water is adsorbed in the downstream dehydration adsorbent layer and is subsequently removed in PSA tail gas during counter-current blowdown and purge steps in the cycle. Molecular sieve zeolite adsorbents can be used at the hydrogen product end of the bed to remove other contaminants, such as nitrogen. A single PSA unit can be used to obtain about 85 to 90% hydrogen recovery. Alternatively, a tail gas compressor can be used in a two-stage PSA design or a recycle configuration for higher recovery of hydrogen product (98+%).

It has been found that either temperature swing adsorption or pressure swing adsorption may be used to effectively treat a gas stream containing hydrogen, oxygen and water. In a temperature swing adsorption system, a compressed gas stream from an electrolyzer is sent to a temperature swing adsorption unit to enter through the top of a vessel containing three or four layers of adsorbent material. The first layer of adsorbent is a dehydration adsorbent, also referred to as a desiccant to remove water. Then the next layer is a copper material on an activated alumina which causes the oxygen to react with hydrogen to produce water. The next layer is another layer of a dehydration adsorbent that removes the water produced in the previous layer. The hydrogen product exiting the bottom of the vessel is then sent to be used as needed. A portion of the hydrogen product may be sent to a regeneration heater to be heated and then sent to the temperature swing adsorption unit to desorb impurities within the layers of adsorbent. A portion of the compressed feed stream from the electrolyzer may be sent to the regeneration heater to provide the necessary fuel for heating the regeneration gas. An electrical heater can also be used, especially for small scale systems. In the case of a pressure swing adsorption unit, a compressed hydrogen stream is also sent to the PSA unit to be separated into a hydrogen product with a portion of the hydrogen becoming part of a tail gas together with the water and nitrogen impurities.

EXAMPLE 1

This example is for hydrogen purification from a water electrolyzer. Feed gas to the PSA unit is water saturated and is contaminated with 1,000 ppmv oxygen and 1,000 ppmv nitrogen. PSA vessels were loaded with a 25 vol % layer of silica gel at the feed end of the bed, followed by a 20 vol % layer of copper containing catalyst, followed by a 20 vol % layer of silica gel, and finally a 35 vol % layer of CaX zeolite molecular sieve. The 6-bed PSA cycle shown in Table 1 and Table 2 was used to purify the electrolyzer hydrogen feed gas, with results given in the Table 4 material balance. About 87% hydrogen recovery was achieved with a product purity of 99.97 mol % and less than 300 ppmv nitrogen, less than 5 ppmv oxygen, and less than 5 ppmv water. About 99% of the oxygen in the feed gas was converted to water in the copper catalyst layer during the PSA cycle, according the following oxidation reaction: $O_2 + 2H_2 \rightarrow 2H_2O$. This water was completely removed in the tail gas stream.

TABLE 1

6-Bed PSA Cycle Chart
ADS

| | |
|---|---|
| EQ1D | EQ2D |
| EQ3D | PP |
| BD | PURGE |
| EQ3U | EQ2U |
| EQ1U | REP |

TABLE 2

Detailed Description of 6-bed PSA Cycle in Table 1.

| Step | Abbreviation | Flow Direction | Time * | Starting Pressure, kPa | Ending Pressure, kPa |
|---|---|---|---|---|---|
| Adsorption | ADS | Up | x | 3120 | 3120 |
| Equalization 1 | EQ1D | Up | 0.3x | 3120 | 2280 |
| Equalization 2 | EQ2D | Up | 0.7x | 2280 | 1460 |
| Equalization 3 | EQ3D | Up | 0.3x | 1460 | 930 |
| Provide Purge | PP | Up | 0.7x | 930 | 450 |
| Blowdown | BD | Down | 0.3x | 450 | 150 |
| Purge | PURGE | Down | 0.7x | 150 | 150 |
| Equalization 3 | EQ3U | Down | 0.3x | 150 | 670 |
| Equalization 2 | EQ2U | Down | 0.7x | 670 | 1460 |
| Equalization 1 | EQ1U | Down | 0.3x | 1460 | 2280 |
| Feed Repressurization | FREP | Up | 0.7x | 2280 | 3120 |

* x = sub-cycle time (ranges from 50 to 150 sec)

TABLE 3

Computer Simulation Results for PSA using Cycle in Table 1 and Table 2.

| | Feed Gas, Mol % |
|---|---|
| Hydrogen | 99.55 |
| Nitrogen | 0.10 |
| Oxygen | 0.10 |

TABLE 3-continued

Computer Simulation Results for PSA
using Cycle in Table 1 and Table 2.

| | |
|---|---|
| Water | 0.25 |

Pressure: 3120 kPa
Temperature: 40° C.

| | PSA Bed Loading, Vol % |
|---|---|
| CaX Zeolite (product end) | 35 |
| Silica Gel | 20 |
| Copper/Alumina | 20 |
| Silica Gel (feed end) | 25 |

TABLE 4

PSA Material Balance

| | Feed | Product | Tail Gas |
|---|---|---|---|
| Molar Flow, kgmol/hr | 300 | 259 | 41 |
| Pressure, kPa | 3120 | 3040 | 150 |
| Temperature, ° C. | 40 | 50 | 40 |
| Composition, mol % | | | |
| Hydrogen | 99.55 | 99.97 | 96.1 |
| Nitrogen | 0.10 | <300 ppmv | 0.6 |
| Oxygen | 0.10 | <5 ppmv | <100 ppmv |
| Water | 0.25 | <5 ppmv | 3.3 |
| Total | 100.00 | 100.00 | 100.00 |

EXAMPLE 2

This example is for hydrogen purification from a water electrolyzer by use of temperature swing adsorption. Feed gas to the TSA unit is water saturated and is contaminated with 1,000 ppmv oxygen. In this case, there is no nitrogen in the feed gas. TSA vessels were loaded with a 40 vol % layer of NaX zeolite adsorbent for water removal at the feed end of the bed, followed by a 30 vol % layer of copper containing catalyst, and finally a 30 vol % layer of NaX zeolite molecular sieve. The 3-bed TSA cycle shown in Table 5 and Table 6 was used to purify the electrolyzer hydrogen feed gas, with results given in the TABLE 8 material balance. A portion of the dried and oxygen free TSA product stream was used as regeneration gas at 280° C. and cooling gas at 50° C. in the TSA cycle in a counter-current (upward) flow direction with respect to feed flow (downward). The regeneration gas effluent stream is cooled to about 40° C. and water is condensed to form the condensate stream shown in TABLE 8. About 100% hydrogen recovery was achieved with a product purity of greater than 99.99 mol % with less than 5 ppmv oxygen and less than 5 ppmv water. Substantially all of the oxygen in the feed gas was converted to water in the copper catalyst layer during the TSA cycle, according to the following oxidation reaction: $O_2 + 2H_2 \rightarrow 2H_2O$. This water was completely removed in the downstream second NaX zeolite layer and is completely removed during the regeneration step in the TSA cycle.

TABLE 5

Three-Bed TSA Cycle Chart

ADS
HEAT
COOL

TABLE 6

Detailed Description of 3-bed TSA Cycle in Table 5.

| Step | Abbreviation | Flow Direction | Time * | Starting Pressure, kPa | Ending Pressure, kPa | Gas Inlet Temperature, ° C. |
|---|---|---|---|---|---|---|
| Adsorption | ADS | Down | x | 3120 | 3120 | 40 |
| Heating | HEAT | Up | x | 3120 | 3120 | 280 |
| Cooling | COOL | Up | x | 3120 | 3120 | 50 |

* x = sub-cycle time (ranges from 2 to 24 hours)

TABLE 7

Computer Simulation Results for TSA
using Cycle in Table 5 and Table 6.

| | Feed Gas, Mol % |
|---|---|
| Hydrogen | 99.65 |
| Oxygen | 0.10 |
| Water | 0.25 |

Pressure: 3120 kPa
Temperature: 40° C.

| | TSA Bed Loading, Vol % |
|---|---|
| NaX Zeolite (feed end) | 40 |
| Copper/Alumina | 30 |
| NaX Zeolite (product end) | 30 |

TABLE 8

| | TSA Material Balance | | |
|---|---|---|---|
| | Feed | Product | Condensate |
| Molar Flow, kgmol/hr | 300 | 298.6 | 1.4 |
| Pressure, kPa | 3120 | 3040 | 3000 |
| Temperature, ° C. | 40 | 50 | 40 |
| Composition, mol % | | | |
| Hydrogen | 99.65 | >99.99 | 0.0 |
| Oxygen | 0.10 | <5 ppmv | 0.0 |
| Water | 0.25 | <5 ppmv | 100.00 |
| Total | 100.00 | 100.00 | 100.00 |

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, process or status measurements, and data from monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for producing a high-purity hydrogen gas stream from a gaseous feed stream comprising hydrogen and oxygen, and at least one of water and nitrogen, the process comprising sending the feed stream through an adsorbent bed comprising a catalyst material selected from copper, palladium or platinum, and then purging the adsorbent bed in a counter-current direction with a purge stream comprising a hydrogen-rich gas that is substantially free of oxygen. An embodiment of the invention is one, any or all of prior embodiments in this paragraph up through the first embodiment in this paragraph wherein the gaseous feed stream comprises from about 97 mol % to about 99.9 mol % hydrogen, from about 10 ppmv to about 2,000 ppmv oxygen, and water from about 50% to 100% of saturation. An embodiment of the invention is one, any or all of prior embodiments in this paragraph up through the first embodiment in this paragraph wherein the gaseous feed stream comprises from about 100 ppmv to about 2000 ppmv nitrogen. An embodiment of the invention is one, any or all of prior embodiments in this paragraph up through the first embodiment in this paragraph, wherein the product stream comprises more than 99.9 mol % hydrogen, less than about 5 ppmv oxygen, and less than about 10 ppmv water. An embodiment of the invention is one, any or all of prior embodiments in this paragraph up through the first embodiment in this paragraph wherein the product stream comprises less than about 300 ppmv nitrogen. An embodiment of the invention is one, any or all of prior embodiments in this paragraph up through the first embodiment in this paragraph, wherein the adsorbent bed is in a pressure swing adsorption unit and comprises three layers of adsorbent material comprising a first dehydration adsorbent layer, a copper material layer and a second dehydration adsorbent layer. An embodiment of the invention is one, any or all of prior embodiments in this paragraph up through the first embodiment in this paragraph, wherein the adsorbent bed is in a pressure swing adsorption unit and comprises four layers of adsorbent material comprising a dehydration adsorbent layer, a copper material layer, a second dehydration adsorbent layer and a nitrogen removal adsorbent. An embodiment of the invention is one, any or all of prior embodiments in this paragraph up through the first embodiment in this paragraph wherein the first dehydration adsorbent layer and the second dehydration layer comprise silica gel, activated alumina or sodium X zeolite. An embodiment of the invention is one, any or all of prior embodiments in this paragraph up through the first embodiment in this paragraph wherein the first dehydration adsorbent layer and the second dehydration layer comprise silica gel, activated alumina or sodium X zeolite and the nitrogen removal adsorbent comprises a calcium X zeolite or a calcium A zeolite. An embodiment of the invention is one, any or all of prior embodiments in this paragraph up through the first embodiment in this paragraph wherein the adsorbent bed is in a pressure swing adsorption unit comprising three or more adsorption beds wherein the feed stream is at a pressure greater than about 10 bar(g), at a temperature less than about 60° C. and the purge stream is at a pressure less than about 1 bar(g). An embodiment of the invention is one, any or all of prior embodiments in this paragraph up through the first embodiment in this paragraph wherein the adsorbent bed is in a temperature swing adsorption unit wherein the feed stream is at a temperature less than about 60° C. and the purge stream is at a temperature greater than about 180° C. An embodiment of the invention is one, any or all of prior embodiments in this paragraph up through the first embodiment in this paragraph wherein the layer of copper material comprises about 10% to about 40% of the adsorbent bed by volume and each of the desiccant layers comprise about 10% to about 40% by volume of the adsorbent bed. An embodiment of the invention is one, any or all of prior embodiments in this paragraph up through the first embodiment in this paragraph wherein the layer of copper material comprises about 10% to about 30% of the adsorbent bed by volume, each of the desiccant layers comprise about 10% to about 40% by volume of the adsorbent bed and the nitrogen removal adsorbent comprises about 20% to about 50% of the adsorbent bed by volume. An embodiment of the invention is one, any or all of prior embodiments in this paragraph up through the first embodiment in this paragraph wherein the catalyst material comprises more than about 10 wt % copper on an activated alumina support.

A second embodiment of the invention is a system for treating a gaseous feed stream wherein the system comprises at least two adsorbent beds, a gas inlet and a gas outlet wherein the adsorbent beds comprise at least three layers of adsorbent material wherein a first layer adjacent to the inlet comprises a dehydration adsorbent, a second layer comprises a catalyst comprising a copper material and a third layer comprises a dehydration adsorbent. An embodiment of the invention is one, any or all of prior embodiments in this paragraph up through the second embodiment in this paragraph further comprising a nitrogen removal adsorbent between the gas outlet and the third layer. An embodiment of the invention is one, any or all of prior embodiments in this paragraph up through the second embodiment in this paragraph wherein the dehydration adsorbent is selected from silica gel, activated alumina and sodium X zeolite. An embodiment of the invention is one, any or all of prior embodiments in this paragraph up through the second embodiment in this paragraph wherein the nitrogen removal adsorbent is calcium X zeolite or calcium A zeolite. An embodiment of the invention is one, any or all of prior embodiments in this paragraph up through the second embodiment in this paragraph wherein the layer of copper material comprises about 10% to about 40% of the adsorbent bed by volume and each of the dehydration layers comprise about 10% to about 40% by volume of the adsorbent bed. An embodiment of the invention is one, any or all of prior embodiments in this paragraph up through the second embodiment in this paragraph wherein the layer of copper material comprises about 10% to about 30% of the adsorbent bed by volume, each of the dehydration layers comprise about 10% to about 40% by volume of the adsorbent bed and the nitrogen removal adsorbent comprises about 20% to about 50% of the adsorbent bed by volume.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing a high-purity hydrogen gas stream from a gaseous feed stream comprising hydrogen and oxygen and at least one of water and nitrogen, said process comprising sending said feed stream through an adsorbent bed comprising a catalyst material selected from copper, palladium or platinum, and then purging said adsorbent bed in a counter-current direction with a purge stream comprising a hydrogen-rich gas that is substantially free of oxygen.

2. The process of claim 1 wherein said gaseous feed stream comprises from about 97 mol % to about 99.9 mol % hydrogen, from about 10 ppmv to about 2,000 ppmv oxygen, and water from about 50% to 100% of saturation.

3. The process of claim 1 wherein said gaseous feed stream comprises from about 100 ppmv to about 2000 ppmv nitrogen.

4. The process of claim 1, wherein said product stream comprises more than 99.9 mol % hydrogen, less than about 5 ppmv oxygen, and less than about 10 ppmv water.

5. The process of claim 1 wherein said product stream comprises less than about 300 ppmv nitrogen.

6. The process of claim 1, wherein said adsorbent bed is in a pressure swing adsorption unit and comprises three layers of adsorbent material comprising a first dehydration adsorbent layer, a copper material layer and a second dehydration adsorbent layer.

7. The process of claim 1, wherein said adsorbent bed is in a pressure swing adsorption unit and comprises four layers of adsorbent material comprising a dehydration adsorbent layer, a copper material layer, a second dehydration adsorbent layer and a nitrogen removal adsorbent.

8. The process of claim 6 wherein said first dehydration adsorbent layer and said second dehydration layer comprise silica gel, activated alumina or sodium X zeolite.

9. The process of claim 7 wherein said first dehydration adsorbent layer and said second dehydration layer comprise silica gel, activated alumina or sodium X zeolite and said nitrogen removal adsorbent comprises a calcium X zeolite or a calcium A zeolite.

10. The process of claim 1 wherein said adsorbent bed is in a pressure swing adsorption unit comprising three or more adsorption beds wherein said feed stream is at a pressure greater than about 10 bar(g), at a temperature less than about 60° C. and said purge stream is at a pressure less than about 1 bar(g).

11. The process of claim 1 wherein said adsorbent bed is in a temperature swing adsorption unit wherein said feed stream is at a temperature less than about 60° C. and said purge stream is at a temperature greater than about 180° C.

12. The process of claim 6 wherein said layer of copper material comprises about 10% to about 40% of said adsorbent bed by volume and each of said desiccant layers comprise about 10% to about 40% by volume of said adsorbent bed.

13. The process of claim 7 wherein said layer of copper material comprises about 10% to about 30% of said adsorbent bed by volume, each of said desiccant layers comprise about 10% to about 40% by volume of said adsorbent bed and said nitrogen removal adsorbent comprises about 20% to about 50% of said adsorbent bed by volume.

14. The process of claim 1 wherein said catalyst material comprises more than about 10 wt % copper on an activated alumina support.

15. A system for treating a gaseous feed stream wherein said system comprises at least two adsorbent beds, a gas inlet and a gas outlet wherein said adsorbent beds comprise at least three layers of adsorbent material wherein a first layer adjacent to said inlet comprises a dehydration adsorbent, a second layer comprises a catalyst comprising a copper material and a third layer comprises a dehydration adsorbent.

16. The system of claim 15 further comprising a nitrogen removal adsorbent between said gas outlet and said third layer.

17. The system of claim 15 wherein said dehydration adsorbent is selected from silica gel, activated alumina and sodium X zeolite.

18. The system of claim 16 wherein said nitrogen removal adsorbent is calcium X zeolite or calcium A zeolite.

19. The system of claim 15 wherein said layer of copper material comprises about 10% to about 40% of said adsorbent bed by volume and each of said dehydration layers comprise about 10% to about 40% by volume of said adsorbent bed.

20. The system of claim 16 wherein said layer of copper material comprises about 10% to about 30% of said adsorbent bed by volume, each of said dehydration layers comprise about 10% to about 40% by volume of said adsorbent bed and said nitrogen removal adsorbent comprises about 20% to about 50% of said adsorbent bed by volume.

* * * * *